US008712832B2

(12) United States Patent
Berkhin et al.

(10) Patent No.: US 8,712,832 B2
(45) Date of Patent: Apr. 29, 2014

(54) BID OPTIMIZATION IN SEARCH ENGINE MARKETING

(75) Inventors: Pavel Berkhin, Sunnyvale, CA (US); Usama M. Fayyad, Sunnyvale, CA (US); Scott Gaffney, San Francisco, CA (US); Bassel Ojjeh, Palo Alto, CA (US); Rajesh Girish Parekh, Mountain View, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2223 days.

(21) Appl. No.: 11/609,782

(22) Filed: Dec. 12, 2006

(65) Prior Publication Data

US 2008/0140489 A1 Jun. 12, 2008

(51) Int. Cl.
*G06Q 30/00* (2012.01)
*G06Q 30/02* (2012.01)

(52) U.S. Cl.
CPC ............ *G06Q 30/02* (2013.01); *G06Q 30/0244* (2013.01)
USPC ........................ 705/14; 705/14.43; 705/14.48

(58) Field of Classification Search
USPC ...................................................... 705/1–28
See application file for complete search history.

(56) References Cited

U.S. PATENT DOCUMENTS

| 7,043,450 B2 | 5/2006 | Velez et al. |
| 2003/0028529 A1 | 2/2003 | Cheung et al. |
| 2003/0055816 A1 | 3/2003 | Paine et al. |
| 2004/0107137 A1 | 6/2004 | Skinner |
| 2007/0005421 A1* | 1/2007 | Labio et al. ..................... 705/14 |
| 2007/0130004 A1* | 6/2007 | Borgs et al. ..................... 705/14 |
| 2007/0282785 A1 | 12/2007 | Fayyad et al. |

FOREIGN PATENT DOCUMENTS

| CN | 101568935 | 10/2009 |
| EP | 2095319 | 9/2009 |
| JP | 2003-178211 | 6/2003 |
| JP | 2010512604 | 4/2010 |
| KR | 10200458459 | 11/2004 |
| KR | 1020050097155 | 10/2005 |
| KR | 1020060116864 | 11/2006 |
| WO | WO 2006/014562 | 2/2006 |
| WO | 2008/073821 | 6/2008 |

OTHER PUBLICATIONS

European Extended Search Report dated Oct. 17, 2011, Application No. 07865375.5-1238/2095319.
Notice from the European Patent Office dated Oct. 1, 2007 concerning business methods, vol. 30, No. 11, Nov. 1, 2007 pp. 592-593, ISSN: 0170-9291.
Korean Office Action dated Oct. 31, 2011, Application No. 2009-7014607.
Japanese Office Action dated Oct. 31, 2011, Application No. 2009-541492.
Kato, "Introduction of Keyword Advertisement", Internet Magazine $2^{nd}$ State No. 112, Japan, Impress Corporation, May 1, 2004, pp. 112-123.

(Continued)

*Primary Examiner* — William A Brandenburg
(74) *Attorney, Agent, or Firm* — Weaver Austin Villeneuve & Sampson LLP

(57) ABSTRACT

Methods and apparatus are described for optimally allocating an online advertising budget for a search engine marketing (SEM) campaign among a fixed set of keywords.

23 Claims, 2 Drawing Sheets

(56) References Cited

OTHER PUBLICATIONS

Chinese Office Action dated Jan. 10, 2012, CN Application No. 200780045988.1.
International Search Report and Written Opinion dated May 19, 2008 from Application No. PCT/US2007/086775.
International Preliminary Report on Patentability dated Jul. 7, 2009 from Application No. PCT/US2007/086775.
Chinese Office Action dated Jan. 25, 2011, CN Application No. 200780045988.1.
Korean Office Action dated Feb. 14, 2011, KR Application No. 2009-7014607.

* cited by examiner

BID OPTIMIZATION IN SEARCH ENGINE MARKETING

BACKGROUND OF THE INVENTION

The present invention relates to search engine marketing and, in particular to techniques for optimizing bids for a set of keywords associated with an online marketing campaign.

Search Engine Marketing (SEM) constitutes a significant portion of the online advertising market. Among other things, SEM involves selecting relevant keywords and initiating and maintaining advertising campaigns targeting search engine users entering the keywords in their search queries. The search engine selects appropriate links to relevant content, and also places sponsored links on the search results page. In order to be included among the sponsored links, an advertiser pays an amount of money to the search engine operator for every user click, i.e., the so called keyword bid.

Unfortunately, there currently are no systematic techniques for efficiently allocating an advertising budget over a suitably constrained set of keywords. Typically, such allocations are done without any real empirical basis. Instead, advertisers use a variety of approaches from exercising a "gut feeling," to simply bidding equally on every keyword. The shortcomings of such approaches are manifest.

More effective techniques for allocating an advertising budget over a set of keywords are therefore desirable.

SUMMARY OF THE INVENTION

According to various embodiments, methods and apparatus are provided for allocating an advertising budget among a fixed set of keywords. Each keyword has a bid, a bid intensity, and a utility associated therewith. The bid intensities associated with selected ones of the keywords are raised such that the advertising budget is not exceeded. The selected keywords have the highest utilities among the fixed set of keywords. When the bid intensities associated with the selected keywords reach maximum values, the bids associated with first ones of the selected keywords are raised such that the advertising budget is not exceeded. The first selected keywords have the highest utilities among the selected keywords.

According to a specific embodiment, the bid intensities associated with second ones of the keywords are lowered in conjunction with raising the bids associated with the first selected keywords to ensure that the advertising budget is not exceeded.

According to another specific embodiment, the bid associated with each keyword is initially set at a minimum bid which guarantees appearance of a link for the associated keyword among sponsored search links associated with search results.

According to yet another specific embodiment, the intensities associated with the keywords are initially set to a uniform intensity such that the advertising budget is not exceeded by the minimum bids.

According to a further specific embodiment, statistics are accumulated for a subset of the keywords representing a conversion rate for each.

According to yet a further specific embodiment, the utility for each of the subset of keywords is derived with reference to the corresponding conversion rate and the associated bid.

According to a still further specific embodiment, the selected keywords are ranked according to the associated utilities.

According to another embodiment, a portion of the advertising budget is reserved for further evaluation of the utilities associated with a subset of the keywords not included among the first selected keywords.

According to still another embodiment, it is determined whether raising the bids associated with the first selected keywords satisfies an optimization condition such that a change in revenue associated with raising the bids is greater than zero.

According to an additional embodiment, the bids associated with the first selected keywords are raised until the utilities associated with the first selected keywords are substantially in equilibrium.

According to a further additional embodiment, a budget allocation is communicated to an entity acting on behalf of an advertiser. The budget allocation is derived with reference to statistics derived from raising the bids and bid intensities.

A further understanding of the nature and advantages of the present invention may be realized by reference to the remaining portions of the specification and the drawings.

DETAILED DESCRIPTION OF SPECIFIC EMBODIMENTS

Figure 1:
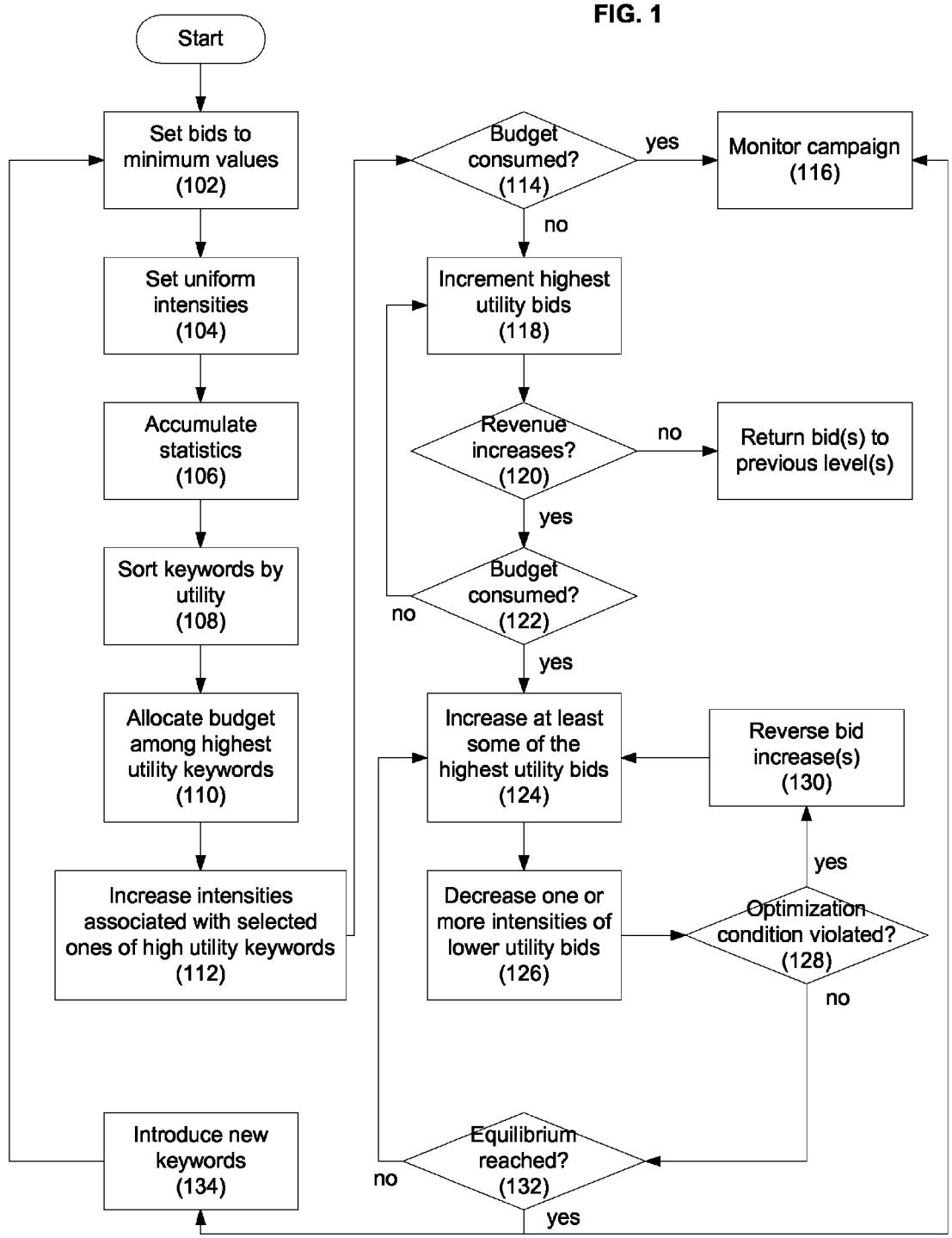
FIG. 1 is a flowchart illustrating operation of a specific embodiment of the present invention.
Figure 2:
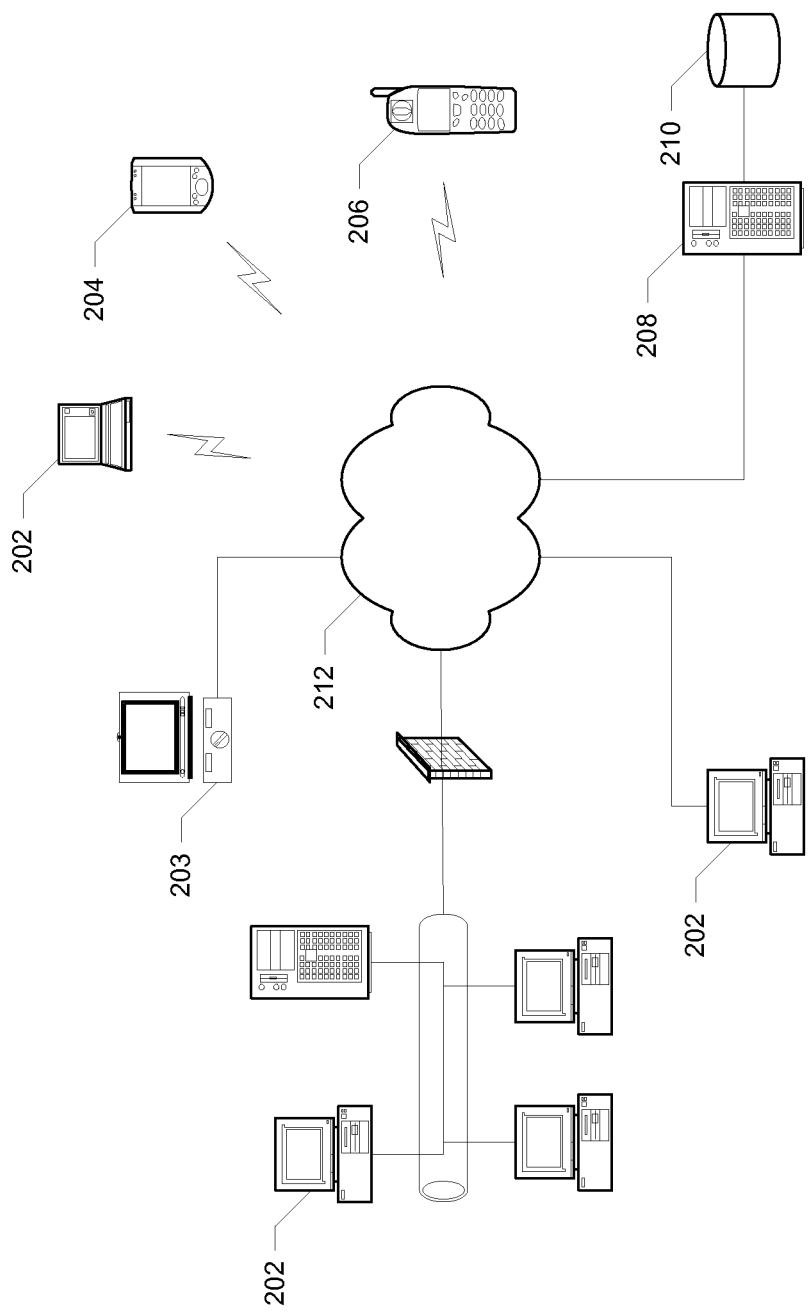
FIG. 2 is a simplified diagram of a network environment in which specific embodiments of the present invention may be implemented.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention address the following problem: Given a budget, how to properly allocate the budget among available keywords. According to specific embodiments, given a fixed set of keywords, there is an optimal bidding strategy based on a concept referred to herein as "keyword utility" that maximizes both revenue and return on investment (ROI) for a fixed budget. According to such embodiments, the optimal allocation is reached by raising bids and intensities for the strongest keywords until you get to a stationary point of (approximately) equal utilities under the given budget constraint. It should be noted that, though in reality search engine operators usually charge advertisers slightly less than their (maximum) bids, this factor is disregarded in the following examples for the sake of simplicity. However, embodiments are contemplated in which this factor is taken into account.

It should also be noted that the set of keywords to which the techniques of the present invention are applied may be derived in a wide variety of ways. For example, keywords may be selected according to marketing research or by observing bidding behavior of similarly situated advertisers. According to one class of embodiments, a keyword set may be derived using the techniques described in U.S. patent application Ser. No. 11/444,996 for KEYWORD SET AND TARGET AUDIENCE PROFILE GENERALIZATION TECHNIQUES filed on May 31, 2006, the entire disclosure of which is incorporated herein by reference for all purposes.

Definitions and Notations

The following concepts and notations will be used herein to describe specific embodiments of the invention. As used herein, the term "keyword" relates to individual words as well as phrases, and is used interchangeably with the term "query." An advertiser defines a set W={w} of keywords related to its business. The advertiser then bids on these keywords in, for example, the SEM context to place sponsored search links whenever users enter a keyword from the set (e.g., in a search query) into a search engine.

W a set of k keywords which may be enumerated, W={$w_1$, $w_2$, . . . , $w_k$}.

f(w) is the probability of keyword w as a search query among all queries, i.e., query frequency; $f_i$=f($w_i$).

b(w) is a bid or bid price for keyword w as set by an advertiser; $b_i$=b($w_i$). The bidding results in a particular position or rank j=j(w, b) for w among other sponsored search results for a keyword w.

$C^{SS}$(w) is a click through rate (CTR) for a keyword w; $C_i^{SS}$=$C^{SS}$($w_i$). Click through rate depends on the position j among other sponsored links. Positions with smaller, i.e., more favorable, j result in a higher CTR. So, the click through rate $C^{SS}$(w) monotonically depends on the bid price b(w). According to a specific embodiment, the click through rate is assumed to be the number of clicks divided by the number of impressions. The term "impression" refers to the presentation of the sponsored link in a sponsored link list associated with search results (as opposed to the click which refers to actual selection of the link by the user).

K(w) is the conversion rate, i.e., the fraction of clicks which result in a desirable event; $K_i$=K($w_i$). The higher the relevance of the advertisement to a keyword w, the higher is the value of K(w). The conversion rate typically depends on relevancy to the keyword and the effectiveness of the landing page and not, in general, on the position of the link. Thus, this parameter is different in this regard from CTR which strongly depends on position.

g is a revenue associated with a single conversion.

Reasonable practical assumptions may be made about introduced quantities. For example, query frequencies are known for frequent queries, and there are reasonable ways to construct a viable proxy for infrequent queries. For example, we may set f(w) equal to some small default value for a particular category of infrequent queries. In another example, the dependence of b(w) on other advertisers bids (due to a process known as "bubbling") may be disregarded.

In addition, it can be argued that the conversion rate K(w) does have some dependence on link position. That is, there is some evidence that users who select sponsored search links placed directly above "organic" search results are less experienced users than those who select sponsored search links placed to the right of the organic search results list. It has been assumed that these inexperienced users may think that the sponsored links are part of the organic results, and that therefore, the conversion rate for such clicks is lower. Nevertheless, it is a useful simplifying assumption to assume no dependence on position.

Problem Formulation

To illustrate the scope of the problem, we first assume that an advertiser is interested in maximizing only one thing—return on investment (ROI). Stating this assumption another way, the advertiser's focus is on the price per conversion rather than the number of conversions. In this scenario, the advertiser should bid the smallest bid price (i.e., the least expensive sponsored search link position) for the single "best" keyword w. The definition of "best" in this context is discussed below. Because the best keyword is used, the ROI for this approach will be the highest. Unfortunately, because the low bid price results in an unfavorable positioning for the sponsored search link, the number of conversions, and consequently total revenue for the campaign, will be extremely low. Thus, this model and its equivalents (e.g., cheapest price-per-acquisition models) are not viable.

To illustrate the other extreme, we instead assume that the advertiser is only interested in maximizing revenues, or equivalently the number of clicks and conversions. The clear way to achieve this is to bid the highest bids that would secure the highest position (e.g., the first position above the organic search results) for every keyword w in W as soon as the price per acquisition is below the revenue per conversion. Under such a bidding strategy, the number of conversions, and consequently revenues for the campaign, is maximized. Unfortunately, the advertising budget grows uncontrollably. That is, the ROI of such a strategy would be unacceptably low from the perspective of most advertisers.

The foregoing examples illustrate that an advertiser cannot construct a campaign which results in both the best possible ROI and the highest possible revenue. However, it is possible, in accordance with embodiments of the present invention, to achieve the best ROI and the highest revenue (or reach) for a fixed advertising budget. This can be understood from the simple formula:

$$ROI = \frac{\text{Revenue}}{\text{Budget}}.$$

When the denominator of this expression is fixed, the maximization of ROI and of Revenue becomes an equivalent problem.

Optimal Bid Allocation

According to specific embodiments of the invention, techniques are provided for developing an optimal bid allocation or distribution in which, for a set of keywords $w_i$, rational bids $b_i$ are determined.

Imagine a user initiates a search using the query w, and a query search results page (let us assume the first page) is returned having one sponsored search link impression. In our notation, the average revenue per one w search is given by:

$$\text{Revenue per one } w = C^{SS}(w) \cdot K(w) \cdot g \quad (1)$$

and the average bidding cost per one w search is given by:

$$\text{Cost per one } w = C^{SS}(w) \cdot b(w). \quad (2)$$

Both quantities should be multiplied by query frequency f(w) if we want w-revenue and w-cost from single average user search. It then follows that ROI per one w search is given by:

$$ROI(w) = \frac{C^{SS}(w) \cdot K(w) \cdot g}{C^{SS}(w) \cdot b(w)} = \frac{K(w) \cdot g}{b(w)}. \quad (3)$$

We will refer to ROI(w) as the keyword utility. From (3) we see that ROI actually does not depend on click through rate. In addition, the conversion revenue g is independent of a keyword w and can therefore be omitted if particular w optimization is involved. Thus, the quantity $$ROI'(w) = \frac{K(w)}{b(w)} \quad (4)$$

can be interpreted as the reach per amount of money spent, thereby establishing the equivalence of revenues and conversion volume. Let us now sort all keywords so that $ROI(w_1) \geq ROI(w_2) \geq \ldots \geq ROI(w_k)$.

Now to formalize the concept of a budget. As used herein, budget B refers to the amount of money spent per one average search. It is combined from different bid costs over a variety of keywords w that happen during the search along with their probabilities:

$$B = \sum_{w \in W} C^{SS}(w) \cdot b(w) \cdot f(w) \cdot u(w) \quad (B)$$

In this formula u(w) is the intensity of the w-bid such that $0 \leq u(w) \leq 1$. Bid intensity refers to a fraction of time to bid on the corresponding keyword. For example, an advertiser may choose not to bid on a particular w at all (i.e., u(w)=0), to bid all the time, i.e., on every occurrence of w (i.e., u(w)=1), or to do something in between. A crude approach to controlling intensity would be to put a bound on the number of impressions. However, a wide variety of approaches may be used, and the particular mechanism by which intensity is controlled is not relevant to the scope of the invention.

If the advertiser bids for the cheapest position for a most profitable keyword w, and budget is so small that $B < C^{SS} \cdot b_1 \cdot f_1$, then no other strategy can be better (note that in this case the intensity $u(w) = C_1^{SS} \cdot b_1 \cdot f_1 / B$). Thus, in this scenario, the best approach for the advertiser is to exhaust the budget on $w_1$ up to the fullest possible intensity.

In reality, such a strategy would result in very few clicks. Therefore, to better illustrate the invention, a more realistic budget will be assumed such that $B > C_1^{SS} \cdot b_1 \cdot f_1$. Assuming an initial bid on $w_1$ having full intensity (i.e., $u_1=1$), what should be done with the remainder of the budget B? There are three alternatives: (1) to increase bid $b_1$, (2) to blend the bid on $w_1$ with bids on other keywords, or (3) to do both.

Recall that an advertiser always can bid more or less for specific keywords. Higher bids results in more a favorable position j in the sponsored search links and therefore a higher click through rate. This, in turn, results in increased revenue. However, higher bids also result in a decrease in ROI given the higher cost per acquisition. Instead, embodiments of the invention enable strategies that, given a fixed budget B, result in the highest revenue. As discussed above, we know that such approaches will also have the maximum ROI among all strategies that have the identical budget B.

An example will be illustrative. For simplicity assume we have only two keywords and that a current allocation between the two keywords fits a budget B. We will also assume initially that $u_1=1$. Using our notation, this may be represented as:

$$C_1^{SS} \cdot b_1 \cdot f_1 + C_2^{SS} \cdot b_2 \cdot f_2 \cdot u_2 = B.$$

As we know, the ROI for this budget distribution is given by:

$$ROI = g \cdot \frac{C_1^{SS} \cdot K_1 \cdot f_1 + C_2^{SS} \cdot K_2 \cdot f_2 \cdot u_2}{C_1^{SS} \cdot b_1 \cdot f_1 + C_2^{SS} \cdot b_2 \cdot f_2 \cdot u_2}$$

$$= g \cdot (C_1^{SS} \cdot K_1 \cdot f_1 + C_2^{SS} \cdot K_2 \cdot f \cdot u_2)/B,$$

where the numerator times g is simply a corresponding revenue.

The goal in this example is to find the condition under which bid $b_1$ should be increased. And because B is fixed, an increase in $b_1$ means a simultaneous decrease in intensity $u_2$ associated with the bidding on $w_2$ in order to preserve budget balance. Assume that the smallest (empirically determined) feasible increase of the current bid $b_1$ is given by $b_{1,new} = b_1 + \Delta b_1$. This results in $\Delta C_1$ increase of click through rate (assuming that the increase in $b_1$ was sufficient to get to the next better position). This, in turn, will increase the budget by $\delta$, necessitating a reduction of an equal amount which may be achieved by decreasing the intensity of the bid on $w_2$ from $u_2$ to $u_{2,new} = u_2 - \Delta u_2$ such that:

$$\delta = (C_1^{SS} + \Delta C_1^{SS}) \cdot (b_1 + \Delta b_1) \cdot f_1 - C_1^{SS} \cdot b_1 \cdot f_1$$

$$\delta = C_2^{SS} \cdot b_2 \cdot f_2 \cdot \Delta u_2 \quad (5)$$

From this we get two equations, the first representing redistributing the budget to keep it constant, and the second representing new revenue (we use symbol R for revenues):

$$(C_1^{SS} + \Delta C_1^{SS}) \cdot (b_1 + \Delta b_1) \cdot f_1 + C_2^{SS} \cdot b_2 \cdot f_2 \cdot (u_2 - \Delta u_2) = B$$

$$R^{new}(C_1^{SS} + \Delta C_1^{SS}) \cdot K_1 f_1 + C_1^{SS} \cdot K_2 \cdot f_2 \cdot (u_2 - u_2) = R + \Delta R, \quad (6)$$

where $$\Delta R = \Delta C_1^{SS} \cdot K_1 \cdot f_1 - C_2^{SS} \cdot K_2 \cdot f_2 \cdot \Delta u_2. \quad (7)$$

From (5) we find that:

$$f_2 \cdot \Delta u_2 = \frac{\delta}{C_2^{SS} \cdot b_2} \quad (8)$$

and $$\delta = \Delta C_1^{SS} \cdot (b_1 + \Delta b_1) \cdot f_1 + C_1^{SS} \cdot \Delta b_1 \cdot f_1 = \Delta C_1^{SS} \cdot b_1^{new} \cdot f_1 + C_1^{SS} \cdot \Delta b_1 f_1$$

or equivalently:

$$\Delta C_1^{SS} = \frac{\delta}{b_1^{new} \cdot f_1} - \frac{C_1^{SS} \cdot \Delta b_1}{b_1^{new}} \quad (9)$$

Notice that (for small $\Delta b_1 > 0$), the positive sign of $\delta$ defines the sign of $\Delta C_1^{SS}$; this is why monotonic dependency of the click through rate on bid is important. Substituting (8) and (9) into (7), we see that the impact on revenue R for a small budget reallocation is:

$$\Delta R = \Delta C_1^{SS} \cdot K_1 \cdot f_1 - C_2^{SS} \cdot K_2 \cdot f_2 \cdot \Delta u_2 = \quad (10)$$

$$\left( \frac{\delta}{b_1^{new} \cdot f_1} - \frac{C_1^{SS} \cdot \Delta b_1}{b_1^{new}} \right) \cdot K_1 \cdot f_1 - C_2^{SS} \cdot K_2 \cdot \left( \frac{\delta}{C_2^{SS} \cdot b_2} \right) =$$

$$\delta \left( \frac{K_1}{b_1^{new}} - \frac{K_2}{b_2} \right) - \frac{C_1^{SS} \cdot K_1 \cdot \Delta b_1 \cdot f_1}{b_1^{new}}$$

Now we will rationalize this formula. Our assumption was that $$\frac{K_1}{b_1} > \frac{K_2}{b_2}.$$

When $\Delta b_1$ is small, the second term containing $\Delta b_1$ is small, while the difference $$\frac{K_1}{b_1^{new}} - \frac{K_2}{b_2}$$

is still positive. We may therefore conclude that a small increase in bid price for the keyword with the larger ROI index offset by a corresponding reduction in the intensity associated with the keyword having the lower ROI results in a positive revenue impact $\Delta R > 0$. Therefore, an optimal bidding strategy corresponds to an equilibrium budget allocation such that:

$$\frac{K_1}{b_1} \approx \frac{K_2}{b_2} \approx ... \approx \frac{K_k}{b_k}. \qquad (11)$$

Since in reality a bid price cannot be changed continuously, when $\Delta b_1/b_1^{new}$ is not small, formula (10) provides a condition when the increase in bid $b_1$ is justified. That is, an increase should be attempted if:

$$\delta\left(\frac{K_1}{b_1^{new}} - \frac{K_2}{b_2}\right) - \frac{C_1^{SS} \cdot K_1 \cdot \Delta b_1 \cdot f_1}{b_1^{new}} > 0 \qquad (12)$$

The condition for justifying a decrease may be similarly derived. It should be noted that, while the foregoing example was described with reference to the case involving two keywords, the technique described may be readily generalized to cases involving any number of keywords, as well as to sets of keywords.

According to a specific embodiment, a simple and efficient algorithm is provided to derive the optimal allocation under the model described above which does not require explicit computation of equation (12). First, observe that an advertiser should never raise a bid on a keyword until the intensity for the current bid has reached 1, i.e., until the advertiser is bidding on each occurrence of the keyword. Then observe that the impact of setting the intensity of the increased bid for that keyword to a non-zero value is that for some fraction of occurrences of the keyword, the sponsored link will be shown at a more favorable position (with higher expected revenue and lower ROI). That is, the advertiser will bid on the same overall number of impressions for the keyword, but some of the impressions will generate a higher click through rate, at the same conversion rate, but at higher cost per click. Imagine, for example, that the user bids on 200 impressions per hour of the keyword, which generates two clicks, and the user pays a penny for each click. The user has additional budget to apply, and increases the intensity of the next higher bid for the keyword, i.e., the bid required to place a sponsored search link at the next higher rank. As a result, the user now bids low on 100 impressions/hr, and higher on the other 100 impressions/hr. The first batch of impressions again generates one click, at cost of one penny. But the next batch now generate three clicks, at a cost of two pennies per click.

In general, each impression has an expected number of conversions, x, and an expected cost, y. By raising the intensity of the higher bid, certain of the impressions (and in fact all of the impressions once the intensity of the higher bid reaches 1) will generate ax conversions, at an expected cost by per conversion. Thus, each impression processed at the higher cost will result in an additional (a−1)x conversions at an additional cost of (b−1)y per conversion. A virtual keyword with these properties may be created which the user can bid on independently of the keyword under consideration. The optimal solution to the model above may then be attained by greedily selecting real and virtual keywords according to this scheme, without ever considering raising a bid—any bid raises are modeled simply by the purchase of virtual keywords.

Once the intensity for a virtual keyword reaches one, a new virtual keyword may be introduced to capture the increase in both conversions and cost that result from moving from rank j−1 to rank j−2. Or if desired, a virtual keyword may be introduced for each keyword and each rank. The algorithm will perform identically whether the virtual keywords are introduced up front or in a lazy manner as the greedy selection proceeds. Further, this greedy algorithm allows either a discrete or a continuous version of the incremental bidding on a keyword.

We will now describe with reference to FIG. 1 an example of a process for allocating an advertising budget among keywords according to a specific embodiment of the invention. Notice that our definition of budget B is that it is equal to the cost per average search which can be computed from a daily advertising budget by dividing the daily budget by the daily number of searches. Notice also that for many tail queries a minimum bid results in a single sponsored search link. Therefore, for such queries we do not necessarily need to waste time on experiments beyond accumulating aggregate statistics. This does not mean that the basic strategy for such queries is different, but simply that application of the strategy may not result in any change except a potential change in intensity.

Initially, each bid $b_i$ is set to the minimum value that guarantees appearance of a link among the sponsored search links on the first (or a sufficiently high enough) search page for each keyword $w_i$ in a fixed set of keywords W (102). Uniform intensities $u_i$=const are set to guarantee that we stay within the budget (104).

Statistics $C^{SS}$ (w) and K(w) are then accumulated (106). Since keywords are different in terms of their relevance and in terms of other advertiser competition, after a while, differences will be identified among sample conversion rates $K_i$ that is a ratio of the number of conversions over the number of clicks. Since the confidence level is initially low, a conservative low-bound estimate is used.

When sufficient statistics are available, the keywords are sorted in order of decreasing utility $ROI_i = gK_i/b_i$ defined by (3) such that $ROI(w_1) \geq ROI(w_2) \geq ... \geq ROI(w_k)$ (108). Keywords having high utilities is where most of the budget is then focused (110). It should be noted that, initially, only a few ROIs will be positive while the ROIs associated with the tail keywords will be zero.

For the top few keywords, i.e., i=1, 2, 3, ..., I, the intensities are then gradually increased (112), moving the $u_i$ as close to 1 as possible with the constraint being to keep total spending on these top few keywords under pB, where p defines a fraction of the budget (e.g., 0.9) used in exploitation. According to a specific embodiment, a portion of budget B (i.e., 1−p)B is reserved for other keywords (e.g., those in the tail or additional keywords) for the purpose of monitoring their statistics for possible future use. For these keywords the intensities remain low.

If the high-intensity, least-bid distribution on the few high-utility keywords consumes the full exploitation budget pB (114), this is considered a desirable outcome, and the advertising campaign may continue to be monitored without taking any immediate action (116). In reality, the majority of advertisers are likely to actively look for new keywords or attempt higher bids on existing ones in order to get more traffic.

If the high-intensity, least-bid distribution reaches full intensity, i.e., $u_i=1$, and the available exploitation budget pB is not reached (114), more of the budget may be introduced into the campaign, i.e., the bids $b_i$ may be increased. According to a specific embodiment, the bids $b_i$ are incrementally increased for the keywords with the highest utilities (118). Each time this is done, it is then determined whether revenues actually increase (120), e.g., as described above with reference to equation (12). If an actual increase is not realized, the bid(s) is (are) returned to previous level(s).

When the exploitation budget pB is fully consumed (122) bids can no longer be increased without offsetting the increases by lowering intensities on other bids. That is, one or more of the bids for specific high utility keywords may continue to be increased (124), but each such increase is then offset by a decrement in the intensity of bids on lower utility keywords (126). The specific amount of such decrements may be derived from equation (8) for the model case of two keywords. As will be understood with reference to the foregoing description, this keeps the budget equation (B) in balance.

After one or more bids of the high utility keywords are increased and offset by decrements of the intensities associated with lower utility keywords, the optimization condition represented by equation (12) is monitored. If the condition is violated (128), the increase is reversed (130).

Eventually, the increases to the bids for the high-utility, full-intensity ($u_i=1$) keywords brings this keywords into a substantial equilibrium (132) represented above by equation (11), $$\frac{K_1}{b_1} \approx \frac{K_2}{b_2} \approx \ldots \approx \frac{K_k}{b_k}.$$

After this, the campaign may be monitored (116), and/or more or different keywords may be introduced (134) and the process repeated.

The lower utility keywords may be maintained with low intensities and be evaluated using the exploration portion of the budget, e.g., $(1-p)B$, in order to keep eye on their statistics. According to a specific embodiment, a relatively high proportion of the budget may initially be allocated to exploration with the portion allocated for exploitation being increased over time, i.e., $p=p(t)$ is an increasing function of time t, $p'(t)>0$. In addition, it is contemplated that keyword sampling, including low-utility and low-frequency keywords, may continue indefinitely.

It should be noted that undesirably high bids can happen for at least two reasons. First, the budget B may be so large that to entirely consume it requires bids to be so high that profitability deteriorates to zero, i.e., the so-called keyword inventory problem. Second, the keywords themselves may be so irrelevant (in terms of a lack of conversions $K_i$) that even reasonable bids violate the profitability requirement. In general, it is desirable to constrain keyword utilities $gK_i/b_i$ from going below one or the advertiser will lose money. Put another way, increases in bids have a limit defined by:

$$gK_i/b_i > 1 \quad (13)$$

It should be noted, that this condition should not be violated during various phases of the above described technique.

An interesting consequence of the approach described above is that an advertiser may choose to ignore click through rates when allocating its advertising budget among keywords. However, click through rates may yet be important in at least one regard. That is, advertisers are definitely interested in developing more creative and effective landing pages for individual keywords or groups of keywords that affect both conversion rates and click through rates. Therefore, according to specific embodiments of the invention, where campaign management resources are limited, prioritization of keywords with respect to landing page improvement may be done based on the index: $C^{SS}(w) \cdot K(w) \cdot f(w)$. The larger the index, the greater the urgency to review its landing page.

Embodiments of the present invention may be employed to facilitate allocation of an advertising budget over keywords for an online advertising campaign in any of a wide variety of computing contexts. For example, as illustrated in FIG. 6, implementations are contemplated in which the relevant population of users interact with a diverse network environment via any type of computer (e.g., desktop, laptop, tablet, etc.) 602, media computing platforms 603 (e.g., cable and satellite set top boxes and digital video recorders), handheld computing devices (e.g., PDAs) 604, cell phones 606, or any other type of computing or communication platform.

And according to various embodiments, user data processed in accordance with the invention may be collected using a wide variety of techniques. For example, collection of data representing a user's interaction with a search engine interface and the associated sponsored links, landing pages, and web sites may be accomplished using any of a variety of well known mechanisms for recording a user's online behavior. Once collected, the user data may be processed in order to facilitate budget allocation according to the invention in a centralized manner. This is represented in FIG. 6 by server 608 and data store 610 which, as will be understood, may correspond to multiple distributed devices and data stores. The budget allocation process may be performed by representatives of individual advertisers, by representatives of search providers (e.g., Yahoo! Inc.), or by representatives of third party advertising services. In the latter two cases, recommendations may then be made to advertisers about how to allocate their advertising budgets, or the campaigns could be initiated and run on their behalves.

The various aspects of the invention may also be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, some of the statistics mentioned above may not be available in all circumstances. However, it will be understood that a variety of alternative metrics and substitutes may be employed without departing from the scope of the invention. For example, conversion events may be registered by a variety of techniques (e.g., so-called beacons), be reported by customers directly, or, in certain cases, be identified with click through rates.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method of allocating an advertising budget among a fixed set of keywords, each keyword having a bid, a bid intensity, and a utility associated therewith, the method comprising:
   raising the bid intensities associated with selected ones of the keywords using one or more computing devices such that the advertising budget is not exceeded, the selected keywords having the highest utilities among the fixed set of keywords; and
   when the bid intensities associated with the selected keywords reach maximum values, raising the bids associated with first ones of the selected keywords using the one or more computing devices such that the advertising budget is not exceeded, the first selected keywords having the highest utilities among the selected keywords.

2. The method of claim 1 further comprising lowering the bid intensities associated with second ones of the keywords in conjunction with raising the bids associated with the first selected keywords to ensure that the advertising budget is not exceeded.

3. The method of claim 1 further comprising initially setting the bid associated with each keyword at a minimum bid which guarantees appearance of a link for the associated keyword among sponsored search links associated with search results.

4. The method of claim 3 further comprising initially setting the intensities associated with the keywords to a uniform intensity such that the advertising budget is not exceeded by the minimum bids.

5. The method of claim 1 further comprising accumulating statistics for a subset of the keywords representing a conversion rate for each.

6. The method of claim 5 further comprising deriving the utility for each of the subset of keywords with reference to the corresponding conversion rate and the associated bid.

7. The method of claim 1 further comprising ranking the selected keywords according to the associated utilities.

8. The method of claim 1 further comprising reserving a portion of the advertising budget for further evaluation of the utilities associated with a subset of the keywords not included among the first selected keywords.

9. The method of claim 1 further comprising determining whether raising the bids associated with the first selected keywords satisfies an optimization condition such that a change in revenue associated with raising the bids is greater than zero.

10. The method of claim 1 wherein raising the bids associated with the first selected keywords comprises raising the bids associated with the first selected keywords until the utilities associated with the first selected keywords are substantially in equilibrium.

11. The method of claim 1 further comprising communicating a budget allocation to an entity acting on behalf of an advertiser, the budget allocation being derived with reference to statistics derived from raising the bids and bid intensities.

12. A computer program product for allocating an advertising budget among a fixed set of keywords, each keyword having a bid, a bid intensity, and a utility associated therewith, the computer program product comprising at least one non-transitory computer readable medium having computer program instructions stored therein operable when executed by at least one computing device to:
   raise the bid intensities associated with selected ones of the keywords such that the advertising budget is not exceeded, the selected keywords having the highest utilities among the fixed set of keywords; and
   when the bid intensities associated with the selected keywords reach maximum values, raise the bids associated with first ones of the selected keywords such that the advertising budget is not exceeded, the first selected keywords having the highest utilities among the selected keywords.

13. The computer program product of claim 12 wherein the computer program instructions are further operable when executed by at least one computing device to lower the bid intensities associated with second ones of the keywords in conjunction with raising the bids associated with the first selected keywords to ensure that the advertising budget is not exceeded.

14. The computer program product of claim 12 wherein the computer program instructions are further operable when executed by at least one computing device to initially set the bid associated with each keyword at a minimum bid which guarantees appearance of a link for the associated keyword among sponsored search links associated with search results.

15. The computer program product of claim 14 wherein the computer program instructions are further operable when executed by at least one computing device to initially set the intensities associated with the keywords to a uniform intensity such that the advertising budget is not exceeded by the minimum bids.

16. The computer program product of claim 12 wherein the computer program instructions are further operable when executed by at least one computing device to accumulate statistics for a subset of the keywords representing a conversion rate for each.

17. The computer program product of claim 16 wherein the computer program instructions are further operable when executed by at least one computing device to derive the utility for each of the subset of keywords with reference to the corresponding conversion rate and the associated bid.

18. The computer program product of claim 12 wherein the computer program instructions are further operable when executed by at least one computing device to rank the selected keywords according to the associated utilities.

19. The computer program product of claim 12 wherein the computer program instructions are further operable when executed by at least one computing device to reserve a portion of the advertising budget for further evaluation of the utilities associated with a subset of the keywords not included among the first selected keywords.

20. The computer program product of claim 12 wherein the computer program instructions are further operable when executed by at least one computing device to determine whether raising the bids associated with the first selected keywords satisfies an optimization condition such that a change in revenue associated with raising the bids is greater than zero.

21. The computer program product of claim 12 wherein the computer program instructions are further operable when executed by at least one computing device to raise the bids associated with the first selected keywords until the utilities associated with the first selected keywords are substantially in equilibrium.

22. The computer program product of claim 12 wherein the computer program instructions are further operable when executed by at least one computing device to communicate a budget allocation to an entity acting on behalf of an advertiser, the budget allocation being derived with reference to statistics derived from raising the bids and bid intensities.

23. A system for allocating an advertising budget among a fixed set of keywords, each keyword having a bid, a bid intensity, and a utility associated therewith, the system comprising at least one computing device configured to:
- raise the bid intensities associated with selected ones of the keywords such that the advertising budget is not exceeded, the selected keywords having the highest utilities among the fixed set of keywords; and
- when the bid intensities associated with the selected keywords reach maximum values, raise the bids associated with first ones of the selected keywords such that the advertising budget is not exceeded, the first selected keywords having the highest utilities among the selected keywords.

* * * * *